(12) United States Patent
Fan (10) Patent No.: US 8,204,306 B2
(45) Date of Patent: Jun. 19, 2012

(54) METHOD FOR IMAGE SEGMENTATION BASED ON BLOCK CLUSTERING FOR IMPROVED PROCESSING OF TOUCHING CHARACTERS

(75) Inventor: Zhigang Fan, Webster, NY (US)

(73) Assignee: Xerox Corporation, Norwalk, CT (US)

(*) Notice: Subject to any disclaimer, the term of this patent is extended or adjusted under 35 U.S.C. 154(b) by 829 days.

(21) Appl. No.: 11/415,625

(22) Filed: May 2, 2006

(65) Prior Publication Data

US 2007/0257939 A1 Nov. 8, 2007

Related U.S. Application Data

(63) Continuation-in-part of application No. 10/866,850, filed on Jun. 14, 2004, now Pat. No. 7,376,272.

(51) Int. Cl.
*G06K 9/34* (2006.01)
*G06K 9/00* (2006.01)

(52) U.S. Cl. ........ 382/173; 382/164; 382/165; 382/166; 382/177

(58) Field of Classification Search .......... 382/162–167, 382/168–171, 173–179, 232
See application file for complete search history.

(56) References Cited

U.S. PATENT DOCUMENTS

| | | | |
|---|---|---|---|
| 3,997,912 A * | 12/1976 | Zsagar | 358/530 |
| 4,630,308 A * | 12/1986 | Hongo | 382/198 |
| 5,767,978 A * | 6/1998 | Revankar et al. | 358/296 |
| 5,900,953 A * | 5/1999 | Bottou et al. | 358/540 |
| 6,633,670 B1 * | 10/2003 | Matthews | 382/176 |
| 6,731,800 B1 * | 5/2004 | Barthel et al. | 382/176 |
| 6,766,053 B2 * | 7/2004 | Fan et al. | 382/170 |
| 6,891,969 B2 * | 5/2005 | Revill | 382/166 |
| 6,973,213 B2 * | 12/2005 | Fan et al. | 382/176 |
| 6,983,068 B2 * | 1/2006 | Prabhakar et al. | 382/162 |
| 7,366,357 B2 * | 4/2008 | Curry et al. | 382/243 |
| 7,376,272 B2 * | 5/2008 | Fan et al. | 382/173 |
| 7,379,593 B2 * | 5/2008 | Fan et al. | 382/173 |
| 7,379,594 B2 * | 5/2008 | Ferman et al. | 382/176 |
| 7,386,167 B2 * | 6/2008 | Imamura | 382/164 |
| 7,403,661 B2 * | 7/2008 | Curry et al. | 382/232 |
| 7,433,535 B2 * | 10/2008 | Mukherjee | 382/266 |

(Continued)

OTHER PUBLICATIONS

U.S. Appl. No. 10/866,850, filed Jun. 14, 2003, Zhigang Fan.

(Continued)

*Primary Examiner* — Jason M Repko
*Assistant Examiner* — Avinash J Yentrapati
(74) *Attorney, Agent, or Firm* — Fay Sharpe LLP (57) ABSTRACT

A method and system is provided for segmenting scanned image data in accordance with mixed raster content processing for more efficient processing of non-uniform color touching objects. The scanned data is segmented to background and foreground layers wherein the foreground layer is comprised of a plurality of objects such as text characters. At least one of the plurality of objects is identified as being non-uniform in color. The non-uniform color object is partitioned into a plurality of sub-objects of predetermined size pixel blocks. The sub-objects are then clustered by uniform color and coded with a binary compression algorithm as a foreground layer segment. Non-uniform color sub-objects are alternatively discarded for compression with the background layer algorithm, or processed for determination of a particular color based upon the color of a plurality of pixels within the sub-object. In such a case, the sub-object can then be compressed in accordance with a foreground layer segment algorithm as the color of the determined color.

20 Claims, 5 Drawing Sheets

U.S. PATENT DOCUMENTS

| | | | |
|---|---|---|---|
| 7,489,830 B2* | 2/2009 | Bloomberg et al. | 382/269 |
| 2002/0051145 A1* | 5/2002 | Watanabe et al. | 358/1.9 |
| 2002/0064313 A1* | 5/2002 | Cheng | 382/239 |
| 2002/0146166 A1* | 10/2002 | Rao et al. | 382/164 |
| 2002/0146167 A1* | 10/2002 | Imamura et al. | 382/164 |
| 2002/0176622 A1* | 11/2002 | Watanabe et al. | 382/165 |
| 2003/0053115 A1* | 3/2003 | Shoda et al. | 358/1.15 |
| 2003/0081836 A1* | 5/2003 | Averbuch et al. | 382/199 |
| 2004/0032516 A1* | 2/2004 | Kakarala | 348/246 |
| 2004/0227758 A1* | 11/2004 | Curry et al. | 345/426 |
| 2005/0138532 A1* | 6/2005 | Park | 714/776 |
| 2005/0180642 A1* | 8/2005 | Curry et al. | 382/232 |
| 2005/0185075 A1* | 8/2005 | Neter | 348/294 |
| 2005/0271274 A1* | 12/2005 | Urano et al. | 382/173 |
| 2005/0275897 A1* | 12/2005 | Fan et al. | 358/2.1 |
| 2005/0286776 A1* | 12/2005 | Bai et al. | 382/232 |
| 2006/0159370 A1* | 7/2006 | Tanaka et al. | 382/305 |
| 2006/0221205 A1* | 10/2006 | Nakajima et al. | 348/226.1 |
| 2007/0014460 A1* | 1/2007 | Kuziela et al. | 382/128 |
| 2007/0098135 A1* | 5/2007 | Kunze | 378/4 |
| 2007/0140571 A1* | 6/2007 | Fan et al. | 382/232 |
| 2007/0257939 A1* | 11/2007 | Fan | 345/636 |
| 2008/0050023 A1* | 2/2008 | Feng et al. | 382/232 |
| 2009/0067709 A1* | 3/2009 | Gross et al. | 382/166 |

OTHER PUBLICATIONS

Z. Fan, T. Jacobs, "Segmentation for Mixed Raster Contents with Multiple Extracted Constant Color Areas", IS&T/SPIE Symposium on Electronic Imaging Science & Technology, San Jose, CA, Jan. 2005.

Zhigang Fan and Timothy Jacobs, Segmentation for Mixed Raster Contents With Multiple Extracted Constant-Color Areas, Electronic Imaging 15.1, Society of Photo-Optical Instrumentation Engineers (SPIE), Dec. 2004, Bellingham, WA.

* cited by examiner

METHOD FOR IMAGE SEGMENTATION BASED ON BLOCK CLUSTERING FOR IMPROVED PROCESSING OF TOUCHING CHARACTERS

This is a Continuation-in-Part of U.S. application Ser. No. 10/866,850, filed on Jun. 14, 2004 now U.S. Pat. No. 7,376,272 by Fan et al. and entitled "METHOD FOR IMAGE SEGMENTATION TO IDENTIFY REGIONS WITH CONSTANT FOREGROUND COLOR".

The subject development relates generally to image segmentation, and particularly to a method to process scanned data representative of a document image wherein portions of the image are better detected for retrieving more efficient storage and high reconstructive image quality. More particularly, a method and system is proposed for performing color clustering on composite block bases for non-uniform color objects such as touching characters of different colors.

BACKGROUND

The present exemplary embodiments are directed to methods for image segmentation to produce a mixed raster content ("MRC") image with multiple extracted constant color areas ("MECCA"). MRC modeling is a powerful image representation concept in achieving high compression ratios while maintaining high constructed image quality. MECCA modeling has the further advantages of relatively undemanding decomposition requirements and inherent text enhancement and noise reduction features. The MECCA model contains one background layer, N foreground layers, and N mask layers where N is a non-negative integer. While the background layer can be a contone bitmap, the foreground layers are restricted to constant colors. U.S. Ser. No. 10/866,850 entitled "Method for Image Segmentation to Identify Regions with Constant Foreground Color", filed Jun. 14, 2003 hereby incorporated by reference in its entirety, details a relevant MECCA modeling method.

The segmenting of the data into either background or foreground text is important because different compression algorithms are much more efficient for different kinds of images. For example, JPEG is a more efficient compression algorithm for pictures while other algorithms are especially designed for binary images like text. Using different compression algorithms for different portions of the scanned image data provides the advantage of a high compression ratio for the data with high quality image reconstruction.

To generate MRC/MECCA representation for an image, segmentation is required. The segmentation algorithm generally consists of four steps, namely object extraction, object selection, color clustering, and result generation. In the first step, text and other objects are extracted from the image. Next, the objects are tested for color constancy and other features to decide if they should be represented in the foreground layers. The objects that are chosen are then clustered in color space as the third step. The image is finally segmented such that each foreground layer codes the objects from the same color cluster.

When the object candidates for foreground layers are first extracted, the clustering is performed to determine how many foreground layers are needed and how each object should be represented therein. There are currently two kinds of color clustering approaches for object representation: pixel based and object based. In the pixel based approach, clustering analysis is performed on pixel colors. As the objects are usually very noisy, the neighboring pixels within one object may often be grouped into different clusters and represented in different foreground layers. This results in very low coding efficiency. The object based approach is currently more prevalent and the clustering is performed on objects instead of pixels. This ensures grouping consistency within an object. Consequently, much higher coding efficiency can be achieved. However, the object based approach requires the object to be constant (at least visually) in color. A color uniformity check is thus required before the clustering. The non-uniform color objects are discarded as foreground candidates and need to be coded in the background later. If a non-uniform color object happens to contain detailed information (e.g. thin characters touching each other), it will result in a coding of either a low quality or a large file size.

Figure 1:
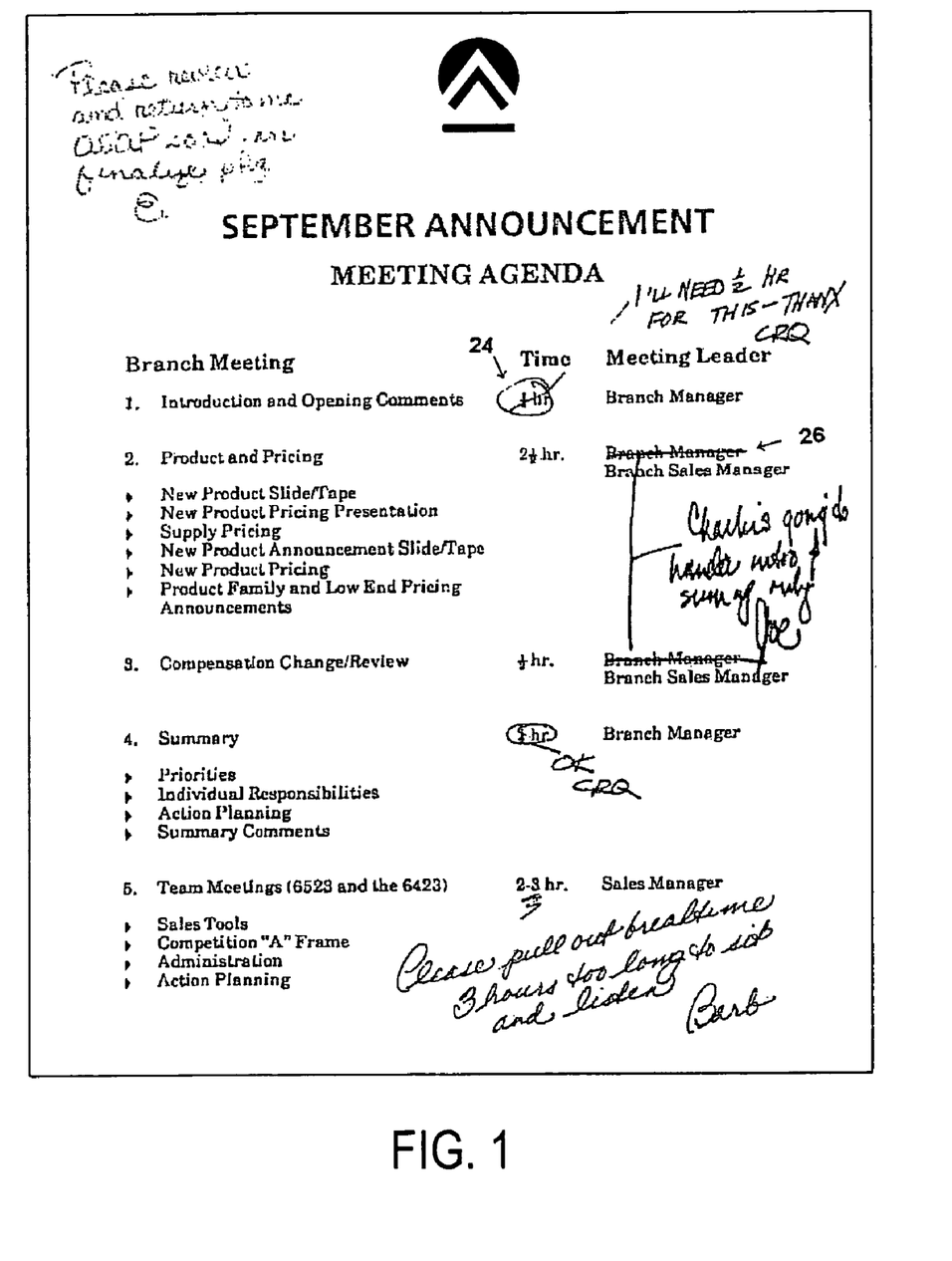
FIG. 1 is an exemplar of a scanned document comprising printed text (black characters) and other ink markings thereon.

With reference to FIG. 1, the particular problems sought to be overcome by the present embodiments are conveniently illustrated. The Figure illustrates an exemplar of a scanned document having portions where black text characters are crowded with differently colored ink markings, i.e., different colors are touching. The Figure shows normal print text characters along with hand-written ink markings. Assume red markings on the black text at the area generally shown by numeral 24 and blue-on-black at area 26. In such cases, and keeping mind that normal text characters are hoped to be coded as a single object, these alphanumeric character objects combining two markings of different color could be identified initially as one object of a non-uniform color. In accordance with the object based clustering approach above, such a character would have to be coded in the background layer, not a foreground layer segment. Since such background layers are usually compressed with JPEG, the compression efficiency for multicolor touching of characters would be very poor.

Alternatively, if a priority were set on good compression, storage would be based on separating the touching characters. Unfortunately, such a segmentation for touching or overlapping markings process is very expensive in processing costs because identifying the exact boundary between touching parts is very difficult to do.

Accordingly, there is a need for a processing method which is more efficient in processing touching characters and can achieve good compression for storage of character blocks of multiple colors.

SUMMARY

An MRC/MECCA segmentation method is provided which more efficiently treats touching characters of a non-uniform color. More particularly, the method performs color clustering on block bases for non-uniform objects. If the blocks are composite sub-objects of a character object, then even a non-uniform color object can be more efficiently processed in MECCA segmentation by the distinct processing of the sub-objects.

In accordance with the present embodiments, a method is disclosed for processing scanned data representative of a document image for achieving high compression ratios and improved reconstructed image quality. The scanned data is first segmented into background and foreground layers where the foreground layers comprise of a plurality of objects. The objects are extracted from the scanned data and each of the objects is then partitioned into a plurality of predetermined sub-objects. The sub-objects may selectively comprise pixel blocks selectively sized 4×4, 8×8, 16×16 or other. The sub-objects are then clustered in accordance with uniform colors. Non-uniform color sub-objects are segregated from the clustered objects and are either coded as a foreground layer segment based upon the majority color pixels of the sub-object, or discarded from the foreground layer segment and coded in the background layer.

Another embodiment avoids the initial partitioning step of all objects and only partitions identified non-uniform color objects into the plurality of sub-objects.

A xerographic system for so processing scanned data includes a processor for identifying at least one of the foreground layer objects as comprising a non-uniform color. A partitioner partitions the identified object into a plurality of sub-object pixel blocks. A clusterer clusters the sub-object pixel blocks in accordance with uniform colors and a coder codes the scanned data corresponding to the clustered sub-object pixel blocks with a compression algorithm for foreground layer objects. Alternatively, the processor may discard the non-uniform color sub-object pixel blocks from the foreground layer so that the coder codes the non-uniform color sub-object pixel blocks with the compression algorithm for the background layer.

DETAILED DESCRIPTION

The subject developments relate to segmenting scanned data for achieving high compression ratios and good reconstruction image quality. As noted above, different types of scanned data can be more efficiently compressed in accordance with different types of compression algorithms. The slowly varying scanned image data portions (pictures) of the image are better compressed by picture compression algorithms like JPEG. Black character text comprising primarily binary images are more efficiently processed with other algorithms especially designed therefore. Transition areas between the text and the background are better compressed by binary compressors. Accordingly, the segmentation process is basically to segment the image into several layers so that the layers carrying slowly varying information are compressed by picture compressors, while the layers carrying the sharp transitions are compressed by binary compressors.

A special problem occurs for scanned text documents comprised of multiple colors touching at what would normally be considered a single object in the data, i.e., a text character. FIG. 1 readily illustrates how this can occur where red or black markings are made onto a text page, a fairly common activity, and then the page is scanned.

Figure 2:
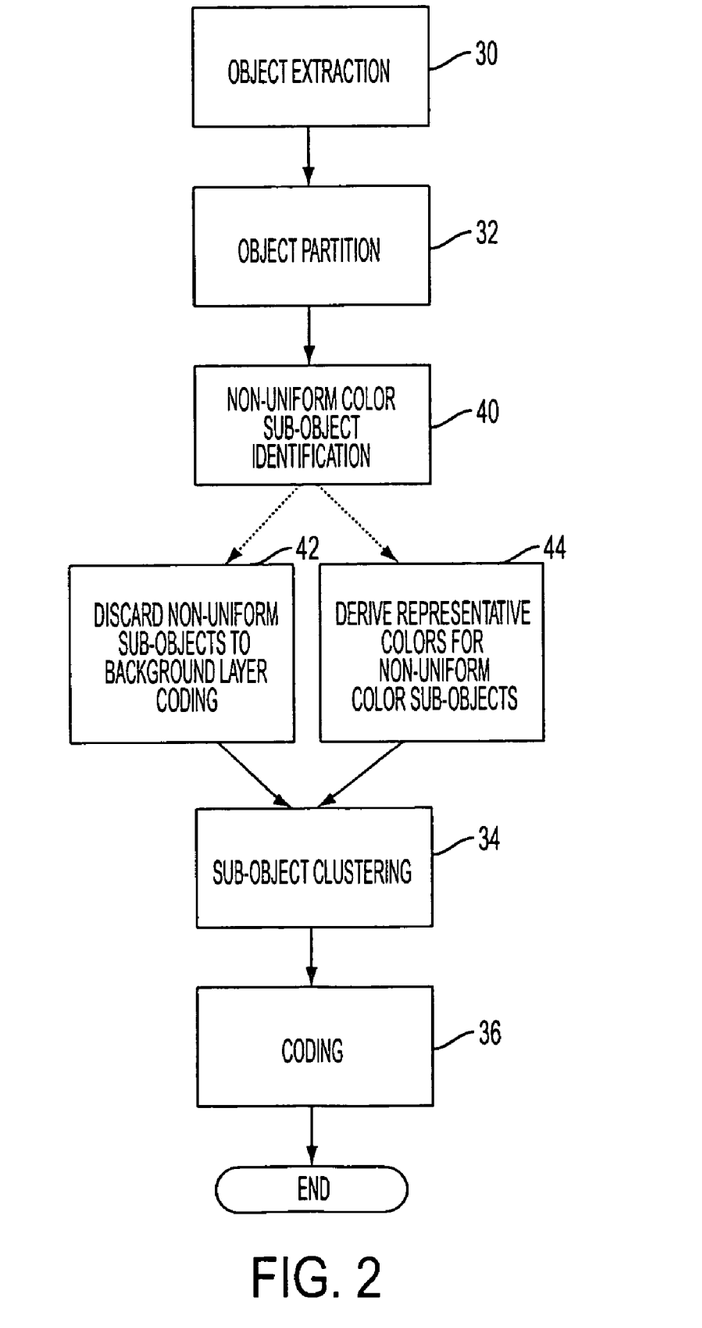
FIG. 2 is a flowchart of one embodiment of a processing method for improved MECCA segmentation of touching objects/characters of scanned data.
Figure 4:
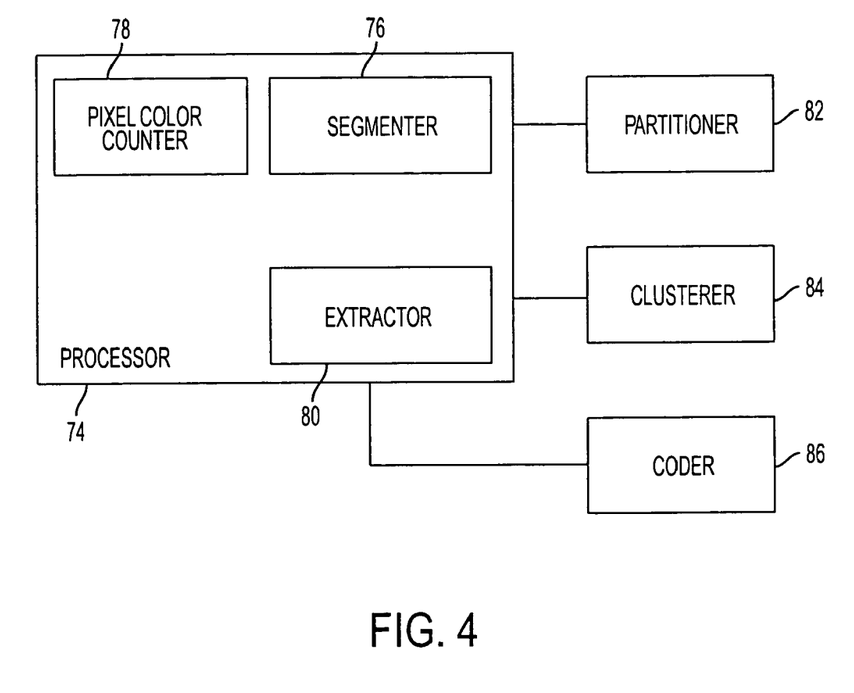
FIG. 4 is a block diagram of a system for MECCA segmentation based on block clustering.
Figure 5:
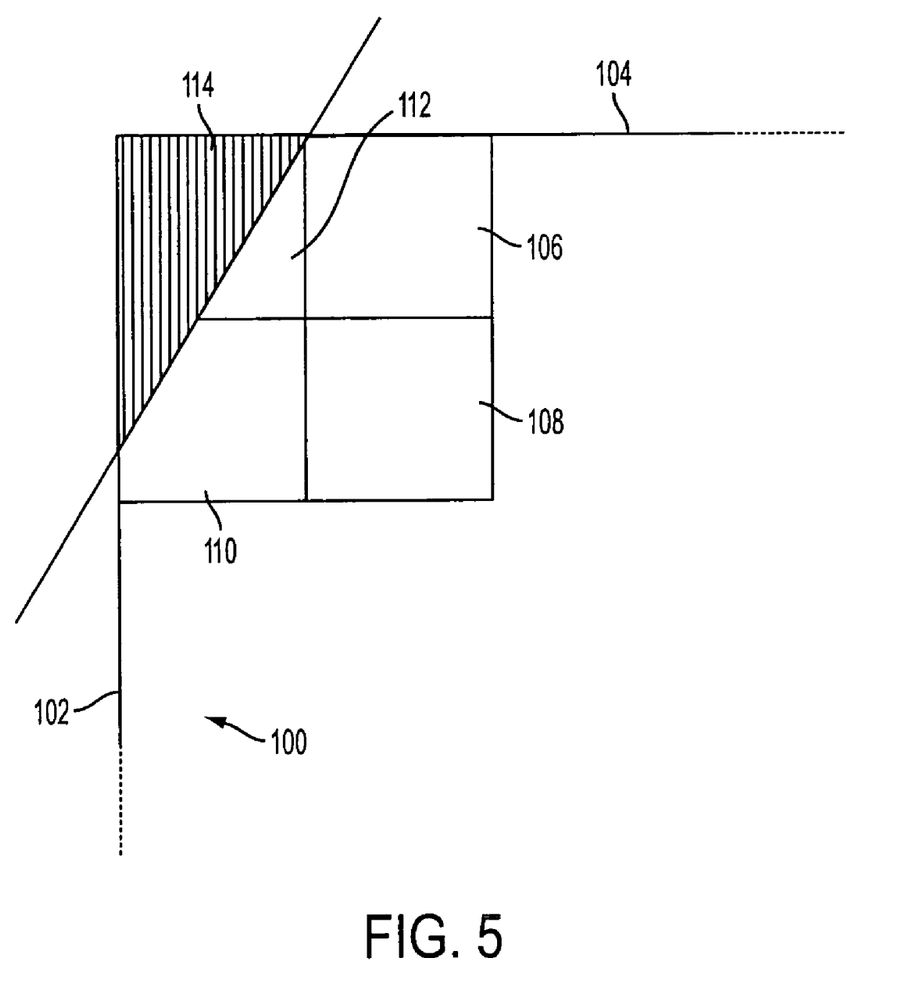
FIG. 5 is an edge portion of a text character showing sub-object pixel blocks and another color ink line drawn across some of the blocks.

With reference to FIGS. 2 and 4, in one embodiment the scanned data is first segmented by a segmenter 76 in processed 74, in accordance with a conventional MRC/MECCA segmentation, between a background layer and a foreground layer comprised of a plurality of objects. An exemplary object is one that can be more efficiently coded by a binary compression algorithm, such as an alphanumerical text character, or another unitary object of uniform color. All the candidate objects for the foreground layer are extracted 30 by the extractor 80 and each object is then partitioned 32 by partitioner 82 into sub-objects. The partitioning is blind (i.e., without consideration of the object shape, color, etc.) One example of such partitioning is to partition at block boundaries, with a selective block size of 4×4, 8×8 or 16×16 for 300 dpi images. In FIG. 5, a common character 100 includes edge boundaries 102, 104 and it can be seen that a portion of the object 100 is partitioned into sub-objects 106, 108, 110, 112. The entire object 100 is so partitioned into a plurality of sub-objects. For a sub-object with uniform or similar colors, a color that represents the sub-object, for example the average color, is derived. The partitioned sub-objects are intended to be clustered 34 by clusterer 84 usually in accordance with uniform or similar color, i.e., all the sub-objects with the same or similar representative colors can be clustered for disposition in the same foreground layer and then coded 36 by coder 86 by the same compression algorithm for good efficient compression and storage of the data. Thus, the sub-objects can be clustered together in a manner so that the partitioning would not change the clustering and coding results. All the sub-objects will still be grouped into the same cluster. However, for non-uniform objects and sub-objects, clustering will necessarily have to occur in more than one group.

With particular reference to FIGS. 2 and 5, it can be seen that sub-objects 110, 112 are of non-uniform color due to an alternative color ink marking 114 being drawn across them. One possible treatment in the processing method for such identified 40 non-uniform color sub-objects is to merely to discard 42 it as a candidate for the foreground layer, i.e., code it in background. As a sub-object is relatively small, blurring may not be visually obvious to a viewer of a reprinted document. Such background coding of non-uniform color sub-objects will not suffer from relatively inefficient compression coding. Another possible treatment is to ignore the non-uniformity of the sub-objects 110, 112, derive representative colors for them, and code them as a foreground layer with the same text coding as adjacent sub-objects 106, 108. Again, as a sub-object is so small, color variation within the sub-object may not be visually significant.

The representative color for a non-uniform sub-object may be determined by pixel color counting 44 within the sub-object. For example, for sub-object 112, ink marking 114 comprises most of the sub-object 112 so that the pixel color counter 78 would determine that the majority of pixels are the color of the mark 114 and the representative color for sub-object 112 would be the color of the mark 114 and sub-object 112 would then be clustered with objects and sub-objects of the same color as marking 114. In sub-object 110 the majority of pixels are of the text color, not the marking 114, so the counter 78 would indicate to the processor 74 that sub-object 110 should be coded in the foreground layer with the same binary compression algorithm as the adjacent text sub-objects 106, 108.

Figure 3:
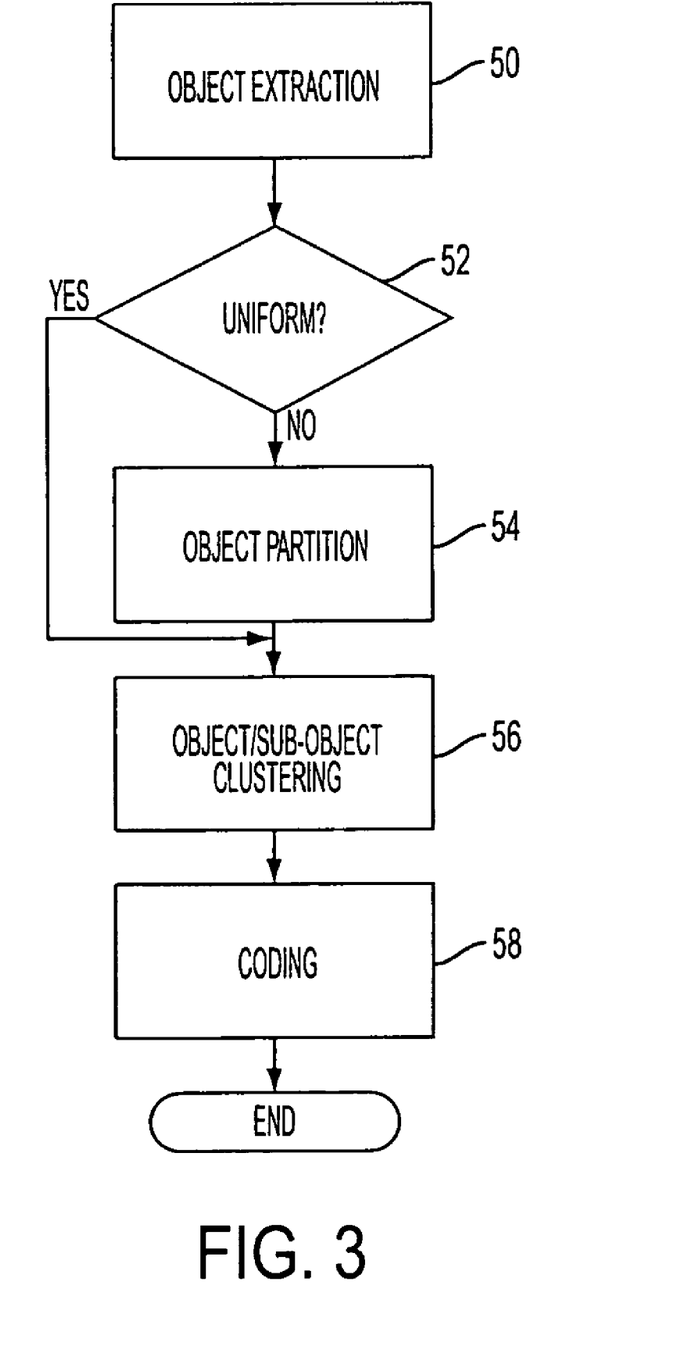
FIG. 3 is another embodiment of a processing method for improved MECCA segmentation of touching objects/characters of scanned data.

The embodiment of FIG. 3 is different from that in FIG. 2 in that the only partitioning that is performed is for identified non-uniform objects. After the objects are extracted 50, any objects of non-uniform color are identified 52 and only those of non-uniform color are partitioned 54. Accordingly, the only partitioning that occurs is for objects which have touching character portions of a non-uniform color. Thereafter, the sub-object clustering 56 and coding 58 can occur in the same manner as FIG. 2.

The claims can encompass embodiments in hardware, software, or a combination thereof.

The word "scanner" as used herein encompasses any apparatus, such as a digital copier, bookmaking machine, facsimile machine, multi-function machine, etc. which performs a document reading function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is

1. A method for processing scanned data representative of a document image comprising:
   segmenting the data into a background layer and foreground layers using the MECCA model wherein the foreground layer is comprised of a plurality of objects;
   identifying at least one of the plurality of objects as non-uniform in color;
   partitioning the non-uniform color object into a plurality of sub-objects by dividing the non-uniform color object at block boundaries into a plurality of preselected-size pixel blocks of at least one of 4×4, and 16×i6 pixel blocks, resulting in non-uniform color sub-objects, where the non-uniform color sub-objects are coded as the foreground layer and the coding includes determining a majority color of pixels in the sub-objects and setting the majority color as a uniform color;
   clustering the sub-objects by uniform color; and
   coding the clustered sub-objects as a foreground layer segment.

2. The method of claim 1 wherein wherein the segmenting is processed in accordance with conventional MECCA segmentation, comprising one contone background layer, N number of mask layers and N number of foreground layers, the foreground layers restricted to constant colors.

3. The method of claim 2 wherein segmentations comprises a segmentation algorithm comprised of four steps of object extraction, object selection, color clustering and result generation.

4. The method of claim 1 wherein the sub-objects with the same or similar representative color are clustered in the same foreground layer.

5. The method of claim 1 wherein coding the clustered sub-objects as a foreground layer segment is based upon the majority color pixels of the sub-object or discarded from the foreground layer segment and coded in the background layer.

6. The method of claim 5 wherein a representative color of the non-uniform sub-object may be determined by pixel counting within the sub-object.

7. A method for processing scanned data representative of a document image for achieving high compression ratios and improved reconstructed image quality, comprising:
   segmenting the data using the MECCA model into one contone background layer, at least N number of mask layers and N number of constant color foreground layers wherein the foreground layer is comprised of a plurality of objects;
   extracting the plurality of objects;
   partitioning the extracted objects into a plurality of predetermined sub-objects;
   clustering the sub-objects in accordance with uniform color; segregating a non-uniform color sub-object from the clustered sub-objects; and,
   coding the clustered non-uniform color sub-objects as a foreground layer segment wherein coding the clustered sub-objects as a foreground layer segment is based upon the majority color pixels of the sub-object coded in the background layer.

8. The method of claim 7 wherein segmenting is processed in accordance with conventional segmentation algorithm comprised of four steps of object extraction, object selection, color clustering, and result generation.

9. The method of claim 8 wherein the non-uniform color object is divided into pixel blocks of one of 4×4 or 16×16 pixels.

10. The method of claim 7, wherein the sub-objects with the same or similar representative color are clustered in the same foreground layer using partitioning.

11. The method of claim 7 wherein the partitioning comprises dividing the non-uniform color object at block boundaries into a plurality of preselected-size pixel blocks.

12. The method of claim 11 wherein the preselected-size pixel blocks comprise one of 4 times 4, and 16 times 16 dimension sized pixel blocks.

13. A xerographic system for processing scanned data in mixed raster content segmented representation, including a contone background layer, N number of mask layers and N number of constant color foreground layers having a plurality of foreground layer objects, and for respectively storing corresponding background and foreground data in distinct compression algorithms; comprising:
   a processor for identifying at least one of the foreground layer objects as comprising non-uniform color;
   a segmenter using the MECCA model for segmenting scanned data into background and foreground layers wherein the foreground layer is comprised of a plurality of objects;
   a partitioner for partitioning the identified object into a plurality of sub-object pixel blocks;
   a clusterer for clustering the sub-object pixel blocks in accordance with uniform color; and,
   a coder for coding the scanned data corresponding to the clustered sub-object pixel blocks with the compression algorithm for foreground layer objects.

14. The system of claim 13 wherein the processor further segments the scanned data into the foreground and background layers, and extracts all objects form the scanned data for intended coding with the foreground layer compression algorithm and wherein the partitioner then partitions the extracted objects into the plurality of sub-object pixel blocks, and identifies non-uniform color sub-object pixel blocks.

15. The system of claim 14 wherein the processor further determines a majority color of pixels on the identified non-uniform color sub-object pixel blocks and communicates the majority color as the uniform color of the non-uniform color sub-object pixel block to the coder.

16. The system of claim 14 wherein the processor further determines that the non-uniform color sub-object pixel blocks are to be discarded from coding as foreground layer, and wherein the coder codes the non-uniform color sub-object pixel blocks with the compression algorithm for the background layer.

17. The system of claim 14 wherein the processor further determines a color of adjacent uniform color sub-object pixel blocks to an identified non-uniform color sub-object pixel block, and communicates the determined color as the uniform color of the non-uniform color sub-object pixel block to the coder.

18. The system of claim 13 wherein the foreground layer objects comprise text characters.

19. The method of claim 13 wherein the partitioning comprises dividing the non-uniform color object at block boundaries into a plurality of at least one of the 4 times 4, 8 times 8, or 16 times 16 preselected-sized pixel blocks.

20. The method of claim 13 wherein the segmenter for segmenting processes in accordance with conventional MECCA segmentation, wherein the MECCA performs color clustering on block bases for non-uniform objects.

* * * * *